United States Patent [19]

Tittmann et al.

[11] Patent Number: 4,869,097

[45] Date of Patent: Sep. 26, 1989

[54] SONIC GAS PRESSURE GAUGE

[75] Inventors: Bernhard R. Tittmann, Thousand Oaks; John M. Richardson, Malibu; James R. Bulau, Moorpark; Lawrence R. Bivins, Thousand Oaks, all of Calif.

[73] Assignee: Rockwell International Corporation, El Segundo, Calif.

[21] Appl. No.: 171,980

[22] Filed: Mar. 23, 1988

[51] Int. Cl.⁴ .............................................. G01L 11/00
[52] U.S. Cl. .......................................... 73/52; 73/703
[58] Field of Search ................... 73/52, 571, 579, 659, 73/702, 703, 584, 596, 602, 630

[56] References Cited

U.S. PATENT DOCUMENTS

| | | | |
|---|---|---|---|
| 3,252,325 | 5/1966 | Miller | 73/702 |
| 3,802,252 | 4/1974 | Hayward et al. | 73/52 |
| 3,942,381 | 3/1976 | Brown et al. | |
| 4,187,718 | 2/1980 | Shibasaki | 73/52 |
| 4,406,157 | 9/1983 | Miyahara et al. | 73/52 |
| 4,474,061 | 10/1984 | Parker | |
| 4,520,654 | 6/1985 | Terhune | |
| 4,604,898 | 8/1986 | Gohin et al. | 73/702 |

FOREIGN PATENT DOCUMENTS 3029838 4/1982 Fed. Rep. of Germany ........ 73/702
759860 8/1980 U.S.S.R. ................................ 73/702

Primary Examiner—John Chapman
Attorney, Agent, or Firm—H. Frederick Hamann; Craig O. Malin

[57] ABSTRACT

A method and an apparatus are provided for measuring the pressure of a gas within a sealed vessel. A sonic transducer is used to apply an oscillating force to the surface of the vessel. The frequency of the ultrasonic wave is swept through a range which causes resonant vibration of the gas in the vessel. A receiving transducer measures the amplitude of the resultant vibration at the vessel surface and reveals the resonant frequency of the gas as peaks in the amplitude of the sweep. The resonant frequency obtained depends upon the composition of the gas, its pressure and temperature, and the shape of the confining vessel. These relationships can be predetermined empirically so that the pressure inside the vessel can be calculated when the composition of the gas, its temperature, and shape of the confining vessel are known. The output of the receiver is fed into a computer which is programmed to calculate the pressure based upon these predetermined relationships which are stored in the computer.

8 Claims, 2 Drawing Sheets

SONIC GAS PRESSURE GAUGE

BACKGROUND OF THE INVENTION

This invention is concerned with the measurement of pressure within sealed containers.

A variety of techniques using acoustic energy to determine the characteristics of a gas or gas mixture sealed within a closed vessel have been disclosed in the prior art. Brown, U.S. Pat. No. 3,942,381, measures the time required from an ultrasonic pulse to propagate across a pressure vessel, echo off the far side, and return. The travel time is related to the pressure of the gas in the container, since this time varies with the velocity of sound in the gas, and the velocity in turn is sensitive to the pressure of the gas. In Shibasaki, U.S. Pat. No. 4,187,718, and Miyahara, U.S. Pat. No. 4,406,157, the internal pressure of a sealed container is determined by measuring the dampening characteristic of a vibrating container wall using a self-correlation function. Parker, U.S. Pat. No. 4,474,061, measures the volume of gas in a container by creating cyclic pressure waves in the gas and detecting the waves with a transducer. This approach requires transducers to be mounted inside the vessel. Terhune, U.S. Pat. No. 4,520,654, determines the concentrations of various gases in a volume of gas by propagating an ultrasonic pulse through the gas. The detected attenuation and velocity of the pulse are compared to a reference pulse in a standard gas mixture in order to estimate the composition of the unknown gas.

In spite of these contributions to the prior art, a continuing need exists for a technique to measure the pressure of a gas within a sealed container. Techniques are needed in which the sonic or ultrasonic wave carrying the information is not overshadowed by other waves traveling in the container. Many applications exist for use with high pressure containers that have walls which may be too stiff for some prior art methods, and for measuring gas pressure entirely from outside the sealed container.

SUMMARY OF THE INVENTION

It is an object of the invention to provide a method and an apparatus to measure the pressure of a gas within a closed vessel.

It is an object of the invention to measure the pressure within a closed vessel by measuring the frequency of resonance of the gas within the vessel.

according to the invention, a sonic transducer applies an oscillating force to the surface of a pressure vessel, the vibration frequency being swept over a predetermined range. A second transducer detects the resulting motion and measures its amplitude over the frequency range. These measurements show a peak in the amplitude caused by a resonance of the gas within the vessel. Its frequency is related to the type of gas, the temperature of the gas, the vessel configuration, and the pressure of the gas within the vessel. Thus, the resonant frequency can be used to measure the gas pressure within a known vessel when the type of gas and its temperature are also known.

The transmitting transducer is driven through the frequency cycle by a function generator. The signal from the receiving transducer is amplified and displayed to provide a curve of amplitude vs frequency of the sonic vibration. The frequency of the resonant peaks on the curve can then be determined and compared to empirically determined curves of amplitude peaks vs frequency to determine the gas pressure in the vessel under test.

Rather than manually determining the gas pressure from peaks on a recorded curve, a computer can be coupled to the receiving transducer and used to collect the signal and calculate the pressure based upon an internally stored calibration. The computer is programmed with a data base containing a calibration curve for the particular gas, temperature, and vessel being measured. The computer collects the information, analyzes it by comparing the information with its data base, and displays the calculated gas pressure. The computer can also be coupled to the function generator so that the entire analysis is controlled by the computer.

These and other objects and features of the invention will be apparent from the following detailed description taken with reference to the accompanying drawings.

DESCRIPTION OF THE INVENTION

Figure 1:
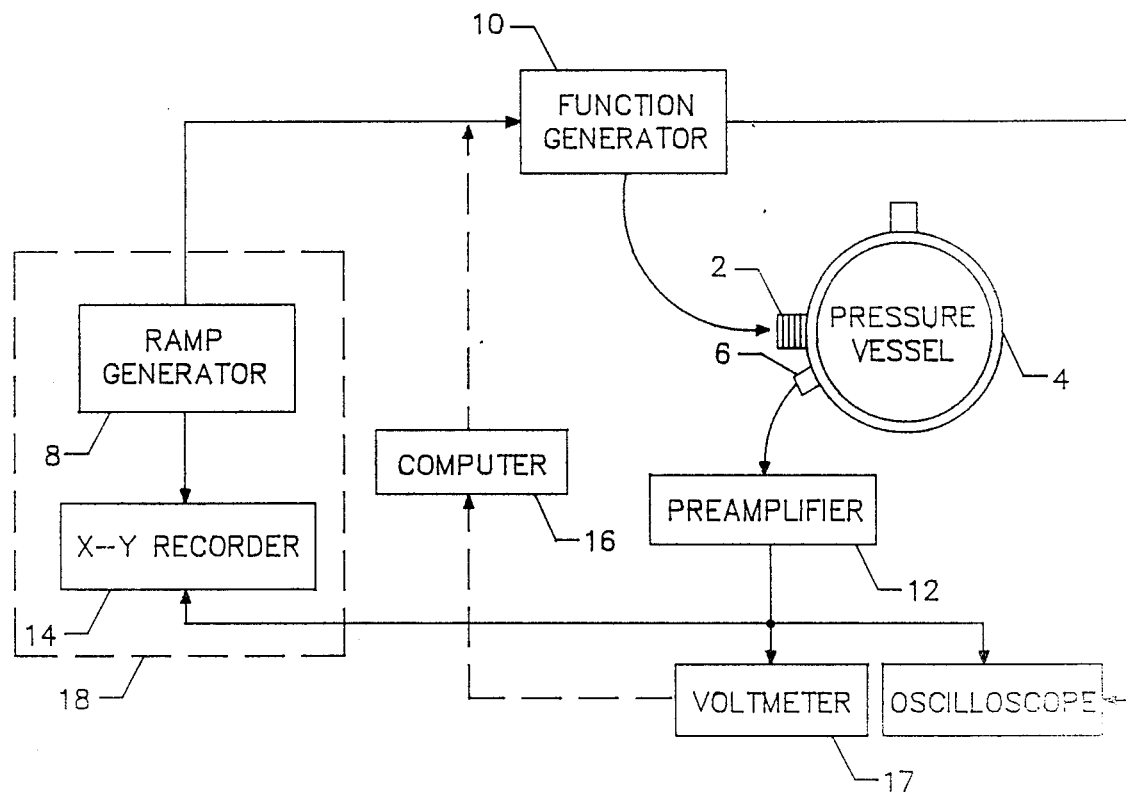
FIG. 1 is a block diagram of the apparatus used to determine the gas resonance inside a pressure vessel.

FIG. 1 shows the apparatus used to measure gas resonance inside a vessel and to determine the gas pressure based upon the measured resonant frequency. An exitation transducer 2 is used to convert an alternating electric signal into a vibration that is applied to the surface of the vessel 4. A receiving transducer 6 is used to convert mechanical vibrations back into electric signals. Extension polarized piezoelectric elements have been used most successfully for both excitation and receiving transducers, although electromagnetic, magnetostrictive, or capacitance devices could be substituted for either or for both. Both the excitation transducer 2 and the receiving transducer 6 are attached to the surface of the vessel 4 by any method that allows vibrations to be transmitted efficiently between the transducers and the vessel. A good temporary bond has been obtained using a pliable adhesive putty. Magnetic coupling has been used in applications where the vessel is composed of ferromagnetic material. The use of a suction device has also been considered.

Transducer 2 is driven through broadband frequency sweeps by ramp generator 8 and function generator 10. The output from receiver 6 is amplified 12 and recorded 14 as a function of exciting frequency. The recording can then be used to determined the resonant frequency of the gas by locating the amplitude peaks which occur during the frequency sweeps. For a given gas, temperature, and vessel, these frequency peaks occur at frequencies which relate to the pressure of the gas.

A computer can be used to automate the measurement process by controlling the frequency of the function generator and collecting amplitude measurements from the voltmeter at various frequencies. As shown in FIG. 1 by dashed lines, computer 16 replaces ramp generator 8 and x-y recorder 14 (block 18). Computer 16 is programmed to identify the frequency of resonance and calculate pressure for the particular vessel being tested and test temperature using calibration curves which are predetermined and stored in the computer memory.

Figure 2:
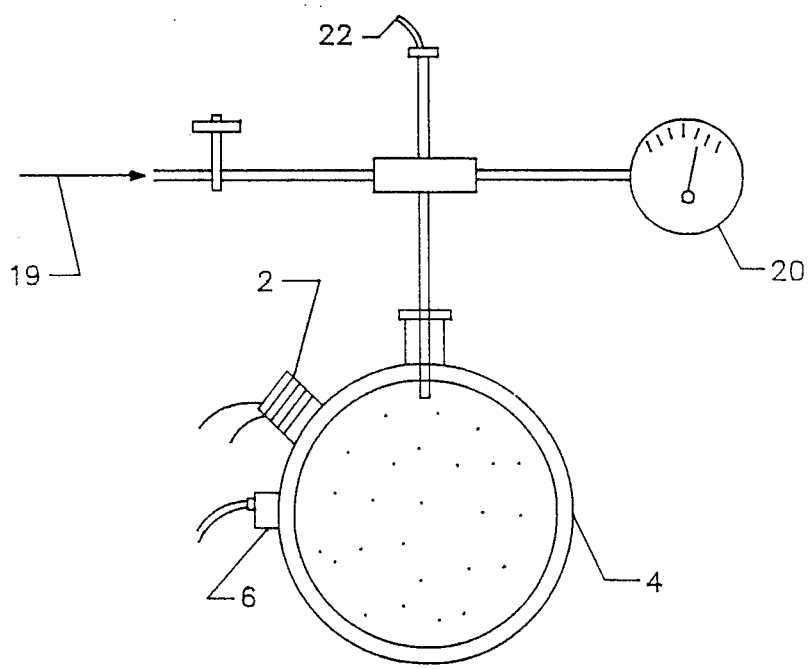
FIG. 2 is an illustration of an arrangement used to determine the relationship between the resonant frequency of a gas and the pressure of the gas within a particular vessel.

FIG. 2 shows a pressure vessel 4 which has been adapted to obtain correlation curves between resonant frequency and gas pressure, and between resonant frequency and temperature of the gas. The vessel is approximately spherical with an inside radius of 9.54 cm. A gas inlet 19 is provided to pressurize vessel 4, and a pressure gauge 20 (a precision bourdon tube) provided to obtain the actual gas pressure within the vessel. A thermocouple 22 is inserted inside vessel 4 to measure the temperature of the gas during the measurement. Tests are then run to determined the resonant frequency of the gas under the known conditions using the transmitting transducer 2 and the receiving transducer 6 as described above.

Figure 3:
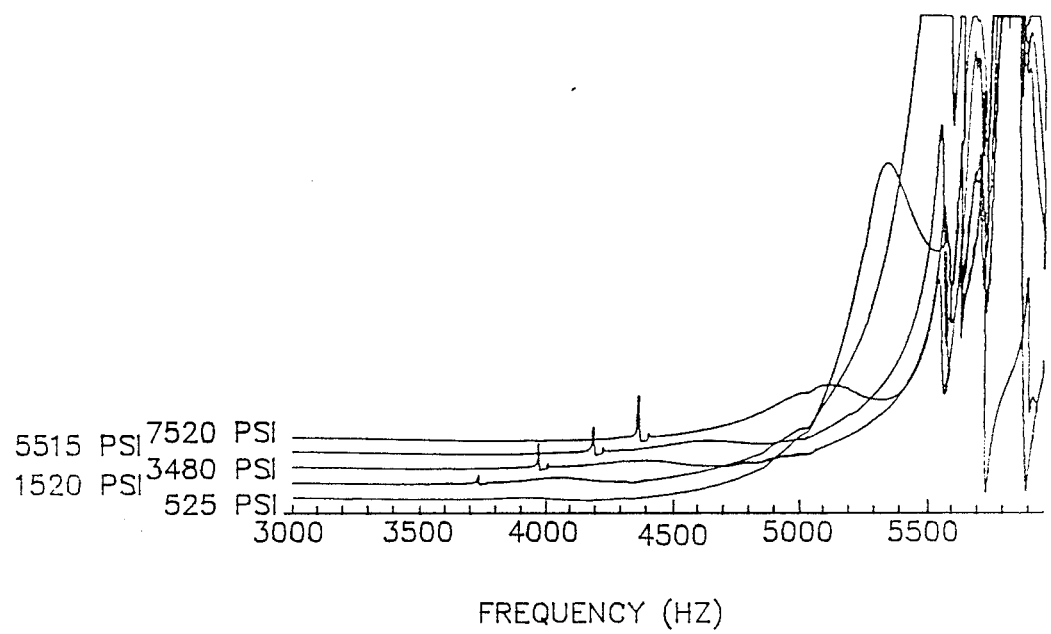
FIG. 3 shows frequency sweep curves obtained at five different pressures.

FIG. 3 shows empirically obtained sweeps of a helium-containing vessel at five different pressures (525 psi to 720 psi). The spectrum is cluttered with many resonances at frequencies above approximately 5500 Hz. These higher frequency peaks include mechanical resonances of the vessel wall and gas resonances. In most cases it was not possible to distinguish between the gas resonances, which shifted in frequency with changes in gas pressure, and had a relatively high "Q"; and mechanical resonances of the vessel wall, which remained more-or-less stationary and had a relatively low "Q". However, gas resonant peaks which occurred at frequencies below 5000 Hz could be distinguished from vessel wall resonances. At the lowest order mode possible corresponding to a transverse motion of gas within the bottle (l=1, n-1), the resonant frequency at ambient pressure was approximately 3550 Hz. At the lowest order mode with spherical symmetry (l-1, n-2), the resonant frequency could not be determined because it is obscured by a multitude of structural resonances at higher frequencies.

Fortunately, the lowest order gas resonance occurs in a window of frequency significantly below the structural resonances. Four of these peaks which clearly show the shift in frequency with changes in gas pressure are shown in FIG. 3. The splitting of the resonance observed in these traces is attributed to a small deviation from perfect spherical symmetry in the geometry of the vessel being tested. The higher frequency peak is associated with an axially symmetric resonance and is excited most efficiently when both transducers are positioned near the vertical axis of the vessel. The lower frequency peak is associated with a resonance on the equatorial plane and is best excited with both transducers on the equatorial plane of the vessel.

When the vessel was filled with nitrogen rather than helium, two gas resonance peaks were clearly resolved at relatively low frequencies. Because the velocity of sound in nitrogen is much lower than it is in helium, all gas resonances were shifted to lower frequency. At ambient pressure, the lowest frequency peak for nitrogen was at 1224 Hz corresponding to the l=1, n=1 mode; and the other peak was at 3461 Hz corresponding to the l=1, n=2 mode.

Figure 4:
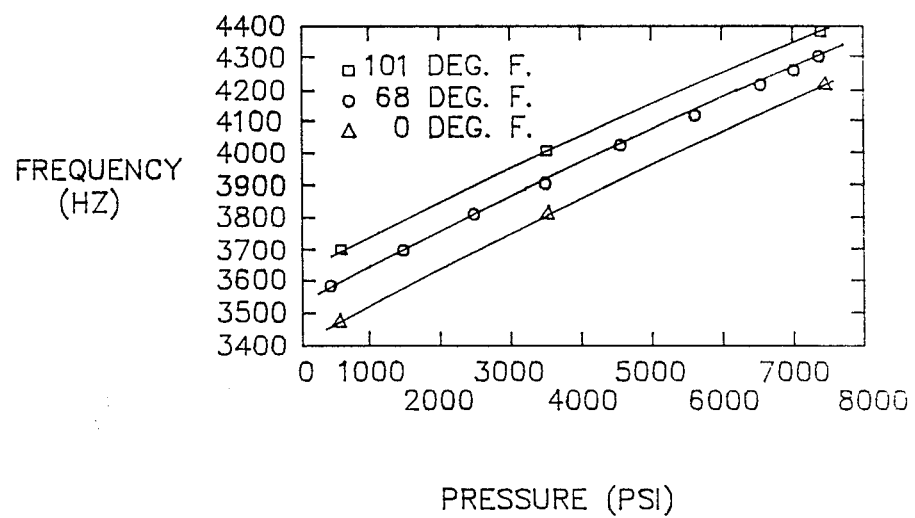
FIG. 4 is a plot of pressure vs resonant frequency for three different temperatures.

In addition to changes caused by changes in gas composition and pressure, the resonant frequency changes as the temperature of the gas changes. FIG. 4 shows calibration curves obtained at three different temperatures for helium in a vessel such as used for the curves shown in FIG. 3.

The pressure vessel used to obtain the curves as described above for FIGS. 3 and 4 was taken from a production assembly which normally includes clamps and pneumatic hardware to make a complete system. Additional tests were run on a complete system in order to determine whether or not the invention could be used to determine the gas pressure of a vessel as installed within a final assembly. As with the free-standing vessel, the lowest order transverse gas resonance peak is clearly resolved from all large system resonances that appear at higher frequencies. However, a number of differences between the gas resonances of the free standing vessel and those of the clamped vessel within the complete system were noted. Clamping the assembly has the effects of: (a) reducing the peak's sharpness, (b) decreasing resonance peak amplitude per unit driving power, and (c) increasing the resonant frequency. If the screws used to secure the vessel within the assembly are loosened, the loosely clamped vessel behaves almost the same as the free-standing vessel and the calibration curves derived using the free-standing vessel are useful for the complete system. Apparently the clamps have the effect of increasing the effective stiffness of the resonator system, resulting in the observed increase in resonant frequency.

THEORETICAL ANALYSIS

In order to better understand the invention, a theoretical analysis of the principles involved has been conducted using the frequencies of the normal modes of oscillations of a gas in a rigid spherical container as given by Morse and Feshbach in "Methods of Theoretical Physics" (1953), McGraw-Hill, NY, namely:

$$ka = \pi\alpha_{ln} \quad (1)$$

where $k = 2\pi f/c$ is the wavenumber of the mode of interest
$c$ = sound velocity of the gas
$f$ = frequency in cycles per unit time
$a$ = internal radius of the container and the dimensionless quantity $\pi\alpha_{ln}$ is the n th solution (in order of increasing magnitude) of the equation $$\frac{d}{d\alpha} j_l(\pi\alpha) = 0 \quad (2)$$

where $j_l(\pi\alpha)$ is the spherical Bessel function of the first kind of order l. This relation arises from the boundary condition that the normal component of gas velocity (or displacement) must vanish at the interior surfaces of the vessel. Eq. (1) can be rewritten in several ways, namely $$f = c\alpha_{ln}/2a \quad (3)$$

or $$\lambda = 2a/\alpha_{ln} \quad (4)$$

where $\lambda$ is the wavelength defined by $\lambda = c/f = 2\pi/k$. The dimensionless quantity $2af/c$ satisfies the relation $$2af/c = \alpha_{ln} \quad (5)$$

values of which are presented in Table 1. It can be shown readily that the degeneracy of each resonance is equal to 2l+1. A general deviation from perfect spherical symmetry will almost surely split a degenerate resonance (l>1) into 2l+1 resonances. A less general deviation may split a degenerate resonance into fewer than 2l+1 distinct resonances.

When the appropriate values of the gas vessel radius and sound velocity are substituted into Eq. (2), excellent agreement between theory and experimental results using helium were obtained assuming that the resonance represented the l=1, n=1 mode of vibration. This is illustrated in Table 2. This mode corresponds to a spatial distribution of perturbed pressure with an angular dependence given by any linear combination of first order spherical harmonics (i.e., like any linear combination of x/r, y/r, and z/r where $r^2=x^2+y^2+z^2$) and the radial dependence involves no nodes (i.e., zeros) between the center and the periphery.

TABLE 1

Table of Reduced Resonant Frequencies, 2af/c, Based on Theory (from Morse and Feshbach, 1953)

|  | n = 1 | n = 2 | n = 3 | n = 4 | n = 5 |
|---|---|---|---|---|---|
| l = 0 | 0 | 1.4303 | 2.4590 | 3.4709 | 4.4775 |
| l = 1 | 0.6626 | 1.8909 | 2.9303 | 3.9485 | 4.9591 |
| l = 2 | 1.0638 | 2.3205 | 3.3785 | 4.4074 | 5.4250 |
| l = 3 | 1.4369 | 2.7323 | 3.8111 | 4.8525 | 5.8786 |
| l = 4 | 1.7974 | 3.1323 | 4.2321 | 5.2869 | 6.3224 |

TABLE 2

A Comparison of Measured Vibration Frequencies at Serveral Pressures With Those Calculated on the Basis of Theory, Assuming a Spherical Vessel with a Radius of 9.45 cm.

| Pressure (psi) | Sound Velocity in He (M/S) | Predicted Frequency (Hz) | Observed Frequency (Hz) |
|---|---|---|---|
| 500 | 1016 | 3564 | 3611 |
| 700 | 1024 | 3592 | 3622 |
| 1000 | 1033 | 3625 | 3664 |
| 2000 | 1070 | 3758 | 3774 |
| 2500 | 1080 | 3791 | 3810 |
| 4600 | 1134 | 3978 | 4053 |
| 7000 | 1195 | 4192 | 4284 |

The preferred embodiments and theoretical basis of this invention have been illustrated and described above. Modifications and additional embodiments, however, will undoubtedly be apparent to those skilled in the art. For example, transducers and instrumentation are available which can transmit a sonic vibration while simultaneously monitoring its amplitude. Consequently, a single transducer can be used as both a transmitter and a receiver. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

What is claimed is:

1. A method of measuring the gas pressure inside a closed vessel having stiff walls, comprising the steps of:
    applying an oscillating force to the external surface of the vessel at a particular frequency which is low enough to distinguish a gas resonance frequency peak from vessel wall resonance;
    detecting the amplitude of the resulting vibration of the vessel at the particular frequency;
    repeating the steps of applying and detecting for a range of frequencies;
    determining from the detected amplitudes the gas resonance frequency peak for acoustic energy within the vessel; and
    relating the resonance peak to the gas pressure within the vessel.

2. The method as claimed in claim 1 wherein the step of determining a resonance peak comprises obtaining a relationship between frequency and amplitude within a predetermined frequency range and selecting the frequency at which a maximum amplitude occurs.

3. The method as claimed in claim 1 wherein the step of relating the resonance peak to the gas pressure comprises obtaining an empirical relationship between pressure and frequency of the resonance peak, and selecting the gas pressure inside the vessel which corresponds to the resonance peak obtained during the step of determining a resonance peak.

4. The method as claimed in claim 1 including the step of compensating the measured gas pressure for the effect of temperature by obtaining a relationship between resonant frequency of a gas and pressure at selected temperatures, measuring the temperature of the vessel, and selecting the gas pressure corresponding to the measured temperature and the determined frequency.

5. An apparatus for measuring the gas pressure inside a closed vessel having stiff walls, comprising:
    a transmitting transducer for applying an oscillating force to the external surface of the vessel over a predetermined frequency range;
    a frequency generator connected to the transmitting transducer for causing the transducer to produce an oscillating force which sweeps with time over a predetermined frequency range at a low enough frequency to distinguish a gas resonance frequency peak from vessel wall resonance;
    a receiving transducer for detecting the amplitude of vibration at the surface of the vessel as a function of the sweep frequency;
    means coupled to the output of the receiving transducer for obtaining the gas resonance frequency peak within the vessel and for relating this frequency to the pressure of the gas in the vessel.

6. The apparatus as claimed in claim 5, wherein the transmitting transducer and the receiving transducer comprise a single transducer.

7. The apparatus as claimed in claim 5 wherein the transmitting transducer is a first piezoelectric transducer and the receiving transducer is a second piezoelectric transducer.

8. The apparatus as claimed in claim 5 wherein the means for obtaining the frequency of gas resonance and for relating this frequency to pressure comprise a computer which is coupled to the frequency generator and to the output from the receiving transducer, the computer being programmed to identify the frequency of gas resonance and to calculate the pressure from an empirically determined relationship between gas resonance frequency and gas pressure which is stored in its memory.

* * * * *